(12) United States Patent
Iwanski et al.

(10) Patent No.: US 9,319,385 B2
(45) Date of Patent: **\*Apr. 19, 2016**

(54) SYSTEM AND METHOD FOR ACCESSING HOST COMPUTER VIA REMOTE COMPUTER

(75) Inventors: Jerry S. Iwanski, Hamilton (CA); K. Andrew White, Toronto (CA)

(73) Assignee: Route 1 Inc., Toronto, Ontario (CA)

( * ) Notice: Subject to any disclaimer, the term of this patent is extended or adjusted under 35 U.S.C. 154(b) by 753 days.

This patent is subject to a terminal disclaimer.

(21) Appl. No.: 12/891,697

(22) Filed: Sep. 27, 2010

(65) Prior Publication Data

US 2011/0016312 A1   Jan. 20, 2011

Related U.S. Application Data

(63) Continuation of application No. 10/935,046, filed on Sep. 7, 2004, now Pat. No. 7,814,216.

(51) Int. Cl.
| | |
|---|---|
| G06F 15/16 | (2006.01) |
| G06F 3/01 | (2006.01) |
| H04L 9/32 | (2006.01) |
| H04L 29/06 | (2006.01) |

(52) U.S. Cl.
CPC .......... *H04L 63/029* (2013.01); *H04L 63/0823* (2013.01); *H04L 63/0281* (2013.01)

(58) Field of Classification Search
CPC .............. H04L 63/0281; H04L 63/029; H04L 63/0823
USPC ................... 709/227–228, 225, 217; 713/168
See application file for complete search history.

(56) References Cited

U.S. PATENT DOCUMENTS

2004/0215979 A1\* 10/2004 Brownell ....................... 713/201
2005/0120204 A1\*  6/2005 Kiwimagi et al. ............ 713/156

\* cited by examiner

*Primary Examiner* — Abdullahi E Salad
(74) *Attorney, Agent, or Firm* — Brenda Pomerance

(57) ABSTRACT

In a peer-to-peer fashion, various host computers communicate with various remote computers using the Internet so that user inputs from the remote computers are transferred to the host computers as if the user inputs occurred locally, and information generated by the host computers is displayed on the remote computers. Thus, a remote computer is able to access all of the information and application programs on the host computer.

15 Claims, 5 Drawing Sheets

SYSTEM AND METHOD FOR ACCESSING HOST COMPUTER VIA REMOTE COMPUTER

CROSS-REFERENCE TO RELATED APPLICATIONS

This is a continuation of U.S. patent application Ser. No. 10/935,046, filed Sep. 7, 2004, to issue as U.S. Pat. No. 7,814,216 on Oct. 12, 2010.

BACKGROUND OF THE INVENTION

The present invention relates to use of a host computer via a remote computer, and more particularly, is directed to enabling peer-to-peer communication between the host computer and remote computer over a communication network.

Immediate access to centrally stored programs and information from a remote device continues to be a desirable goal.

Conventionally, for a remote terminal to access a central computer, the terminal and computer needed to be coupled by a point-to-point communication line, either dedicated or dial-up.

The widespread availability of the Internet has prompted introduction of methods for sharing information between a central device and a remote device using the Internet.

A typical configuration involves a remote computer having a web browser, and a host computer coupled to a web server. The web server handles converting information from the host into hypertext transfer protocol and sending the hypertext messages to the remote. However, this configuration does not enable the remote device to use all applications of the host device that are available to a local user of the host device.

One popular portable device enables a user to receive her email on the device. However, this device is not particularly useful for general access of the host computer's resources from the remote device.

A known software product enables a user of a remote personal computer to access, via the Internet, a host personal computer such that the remote computer provides a visual duplicate of what is occurring at the host computer. This product assumes that the remote computer is in one place during its access session with the host computer.

None of the configurations described above enables a mobile remote device to use all applications of a host computer. Thus, there is still room for improvement in enabling a remote device to access centrally stored programs and information.

SUMMARY OF THE INVENTION

In accordance with an aspect of this invention, there is provided a method of enabling communication between a remote computer and one of a plurality of host computers, comprising establishing, at the remote computer, a connection to a controller, and sending to the controller a selection of a host computer, then receiving identifying information from the selected host computer, and validating the identifying information to determine that a communication channel has been established between the remote computer and the selected host computer.

In accordance with another aspect of this invention, there is provided a method of enabling communication between a host computer and one of a plurality of remote computers, comprising establishing, at the host computer, a connection to a controller, and receiving, at the host computer, parameters for a connection to a selected remote computer, then sending identifying information to the selected remote computer using the received connection parameters, and validating information received from the selected remote computer to determine that a communication channel has been established between the selected remote computer and the host computer.

It is not intended that the invention be summarized here in its entirety. Rather, further features, aspects and advantages of the invention are set forth in or are apparent from the following description and drawings.

DETAILED DESCRIPTION

In a peer-to-peer fashion, various host computers communicate with various remote computers using the Internet so that user inputs from the remote computers are transferred to the host computers as if the user inputs occurred locally, and information generated by the host computers is displayed on the remote computers. Thus, a remote computer is able to access all of the information and application programs on the host computer.

Figure 1A:
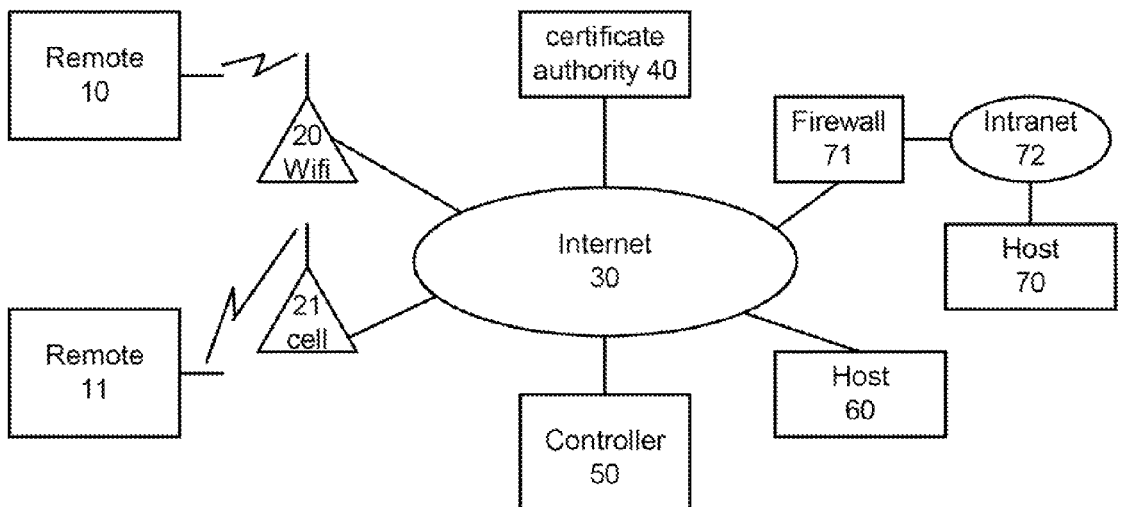
FIGS. 1A-1C are configuration diagrams respectively showing a typical configuration, a logical configuration during set-up and a logical configuration during operation.

FIG. 1A shows a typical configuration in which the present invention is embodied. Generally, remote computers, host computers and a controller are coupled to the Internet via communication channels. The communication channels can be wireless or wireline, and dedicated or temporary.

In particular, FIG. 1A shows remote 10 having a wireless connection to antenna 20, which operates according to the 802.11(b) or 802.11(g) WiFi protocol. Antenna 20 is coupled to Internet 30 via conventional techniques. Remote 11 has a wireless connection to antenna 21, which operates according to a commercial cellular communication protocol such as carrier division multiple access (CDMA) or global service mobile/general packet radio service (GSM/GPRS); typically, remote 11 has its own data channel subscription with a communications carrier. Antenna 21 is coupled to Internet 30 via conventional techniques. Accordingly, remotes 10, 11 are able to send and receive information via Internet 30. Remotes 10, 11 may each be a general purpose computer programmed according to the present invention, and are preferably portable devices such as a tablet PC operating with a Microsoft Windows operating system, or a personal digital assistant (PDA) operating with a Microsoft PocketPC or Windows CE operating system. An iPAQ pocket PC is an instance of remote 10.

Host 60 is coupled directly to Internet 30. That is, host 60 is coupled to an internet services provider (ISP) (not shown) that provides access to Internet 30, in a conventional manner. Host 70 is coupled to local area network 72 and, via firewall 71, to Internet 30. Firewall 71 serves to restrict information flow between Internet 30 and local area network 72. In other cases (not shown), a host computer is coupled to Internet 30 via a firewall, without the presence of a local area network. Hosts 60, 70 are a general purpose computer programmed according to the present invention, typically a personal computer executing a Windows operating system.

Controller 50 is used for enabling dynamic coupling of various remote computers to various host computers. Controller 50 performs authentication, authorization and communications protocol management functions. Controller 50 is a general purpose computer programmed according to the present invention to function as a server with Java runtime environment capability. Controller 50 also executes a database program, such as Oracle.

Certificate authority 40 issues digital identity certificates having public cryptography keys according to a public key infrastructure (PKI) arrangement. An identity certificate is a block of bits containing, in a specified format, the public half of an asymmetric key algorithm key pair (the "public key"), together with identity information, such as a person's name, email address, title, phone number and so on, together with the digital signature of the issuing certificate authority. Certificate authority 40 attests that the public key contained in the certificate belongs to the owner named in the certificate. Instances of certificate authorities include the Microsoft, Entrust, Thawte, RSA and Verisign companies. X.509 is the international standard for digital certificates used in PKI. Trusted third parties—known as Certificate Authorities (CA)—maintain and make the "certificates" accessible (e.g., in an LDAP or X.500 directory), thereby vouching for the authenticity of the signatures. The X.509 standard is provided by the International Telecommunications Union, and is available at http://www.itu.int/rec/recommendation.asp?type=folders&lang=e&parent=T-REC-X.509. The Internet Engineering Task Force has defined several X.509 Public Key Infrastructure standards, available at http://www.ietf.org/html.charters/pkix-charter.html.

Figure 1B:
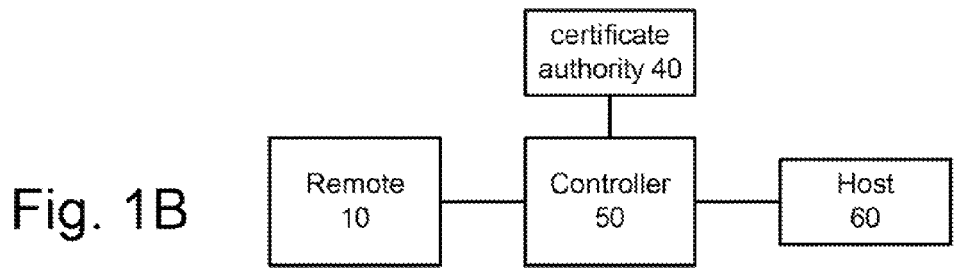

FIG. 1B shows a logical configuration during set-up. Remote 10 communicates directly with controller 50. Host 60 communicates directly with controller 50. A user (not shown) manually transfers an activation code from host 60 to remote 10. Controller 50 communicates with certificate authority 40 to procure certificates for each host computer and each remote computer, and for each authorized pairing of a remote computer and a host computer.

Figure 1C:
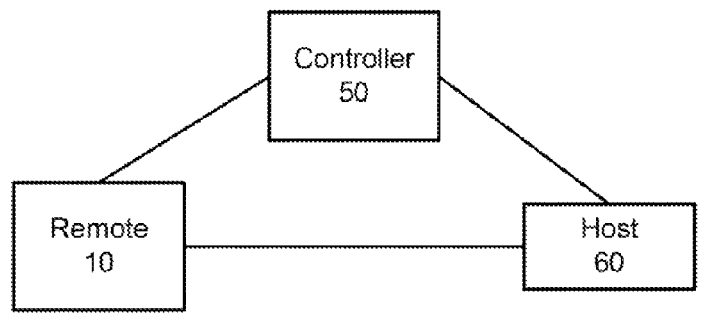

FIG. 1C shows a logical configuration during operation. Controller 50 assists remote 10 and host 60 in setting up a communications connection, and then remote 10 and host 60 communicate directly with each other, without assistance from controller 50. If the communications connection is lost, controller 50 assists in reestablishing the connection.

Figure 2:
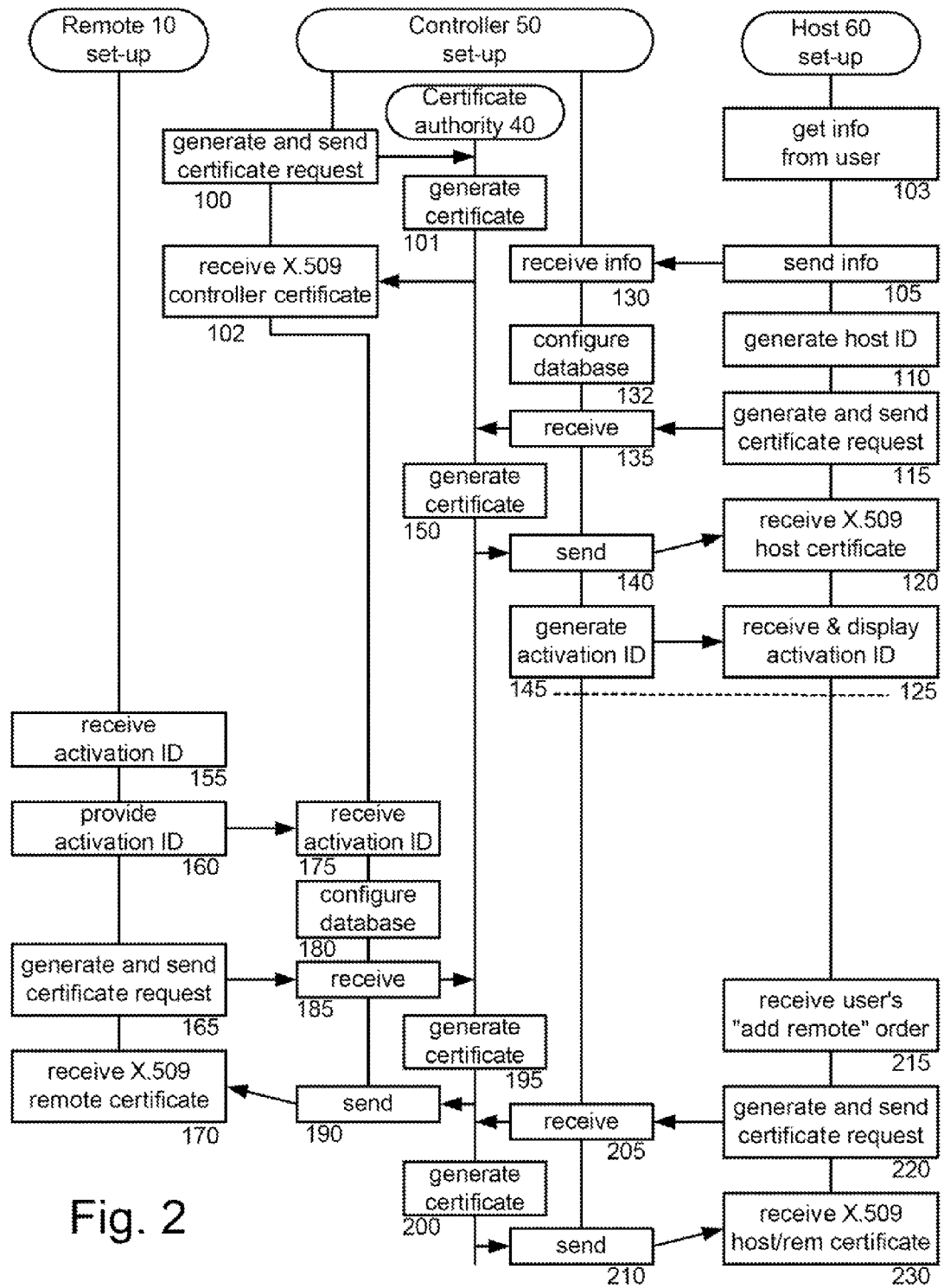
FIG. 2 is a flowchart showing a set-up phase.

FIG. 2 is a flowchart showing a set-up phase.

FIG. 2 shows controller 50 as having one processing sequence for interacting with a host computer, and another processing sequence for interacting with a remote computer. In other embodiments, controller 50 has a more monolithic processing sequence that interacts with both host and remote computers.

At step 100, controller 50 generates a PKI key pair and a certificate request including its controller ID, and sends the certificate request to certificate authority 40. At step 101, certificate authority 40 generates a host certificate and sends it to controller 50. At step 102, controller 50 receives a digital identity certificate pertaining to itself, referred to hereafter as a "controller certificate". The subject field of the controller certificate includes the controller ID.

Set-up of a host computer will now be described.

At step 103, a user (not shown) enters identifying information to host 60, such as name, email address, title, phone number, payment mechanism and so on. At step 110, host 60 sends the identifying information to controller 50 using an anonymous certificate that is part of the software according to the present invention installed on host 60 via a storage medium such as a compact disc (CD) or via download from a website (not shown). At step 110, host 60 generates its own host ID alphanumeric code. In some embodiments, controller 50 generates a host ID and sends it to host 60. At step 115, host 60 generates a PKI key pair and a certificate request and sends the certificate request to controller 50. At step 120, host 60 receives a digital identity certificate pertaining to itself, referred to hereafter as a "host certificate". The subject field of the host certificate includes the host ID. At step 125, host 60 receives an activation ID from controller 50 and displays the activation ID to the user.

Corresponding to the above-mentioned activity, at step 130, controller 50 receives the identifying information from host 60 and at step 132 creates a database entry for host 60. At step 135, controller 50 receives the certificate request from host 60, and forwards the request to certificate authority 40. At step 150, certificate authority 40 generates a host certificate and sends it to controller 50, which in turn, at step 140, sends it to host 60. At step 145, controller 50 generates an activation ID, sometimes referred to as a host activation ID, and sends it to host 60. The host activation ID is a large encoded number that is difficult to guess, such as a number having a length of 128 bits. At this point, controller 50 and host 60 are now configured to operate with each other. For each remote that is to be authorized to operate with host 60, steps 205-230 are performed. These steps are discussed below.

Set-up of a remote computer will now be described. A remote computer is responsible for activating its association with each host computer that it wishes to communicate with.

At step 155, the user activates software on remote 10, such as by clicking on an icon labelled "activation" and enters the host activation ID obtained at step 125 so that remote 10 receives the host activation ID. At step 160, remote 10 sends the activation ID to controller 50. At step 165, remote 10 generates a PKI key pair and a certificate request and sends the certificate request to controller 50. At step 170, remote 10 receives a digital identity certificate pertaining to itself, referred to hereafter as a "remote certificate". The subject field of the remote certificate includes a remote ID. The remote ID is generated by remote 10. In other embodiments, the remote ID is a number provided by the hardware of remote 10, or is generated by controller 50 and sent to remote 10.

Corresponding to the above-mentioned activity, at step 175, controller 50 receives the host activation ID from remote 10, and at step 180, controller 50 updates its database to reflect that remote 10 is activating an association with host 60. At step 185, controller 50 receives the certificate request from remote 10, and forwards the request to certificate authority 40. At step 195, certificate authority 40 generates a remote certificate and sends it to controller 50, which in turn, at step 190, sends it to remote 10.

Authorizing a host to communicate with a remote will now be described.

At step 215, the user instructs host 60 to allow access from remote 10, and host 60 receives this instruction. In this embodiment, the user enters the remote ID for remote 10 directly to host 60. In other embodiments, the user at host 10 clicks on an icon that prompts host 10 to get a list of newly activated remotes from controller 50, or a full list of activated remotes from controller 50, and then the user selects a remote from the list. In still other embodiments, remote 10 displays its own remote activation ID that must be entered at host 60 in a complementary manner as what was done to activate remote 10.

At step 220, host 60 generates a PKI key pair and a certificate request and sends the certificate request to controller 50. At step 230, host 60 receives a digital identity certificate pertaining to the authorization access for remote 10, referred to hereafter as a "host/remote certificate". The subject field of the host/remote certificate includes the host ID and the remote ID.

Corresponding to the above-mentioned activity, at step 205, controller 50 receives the certificate request from host 60, and forwards the request to certificate authority 40. At step 200, certificate authority 40 generates a host certificate and sends it to controller 50, which in turn, at step 210, sends it to host 60.

Figure 3A:
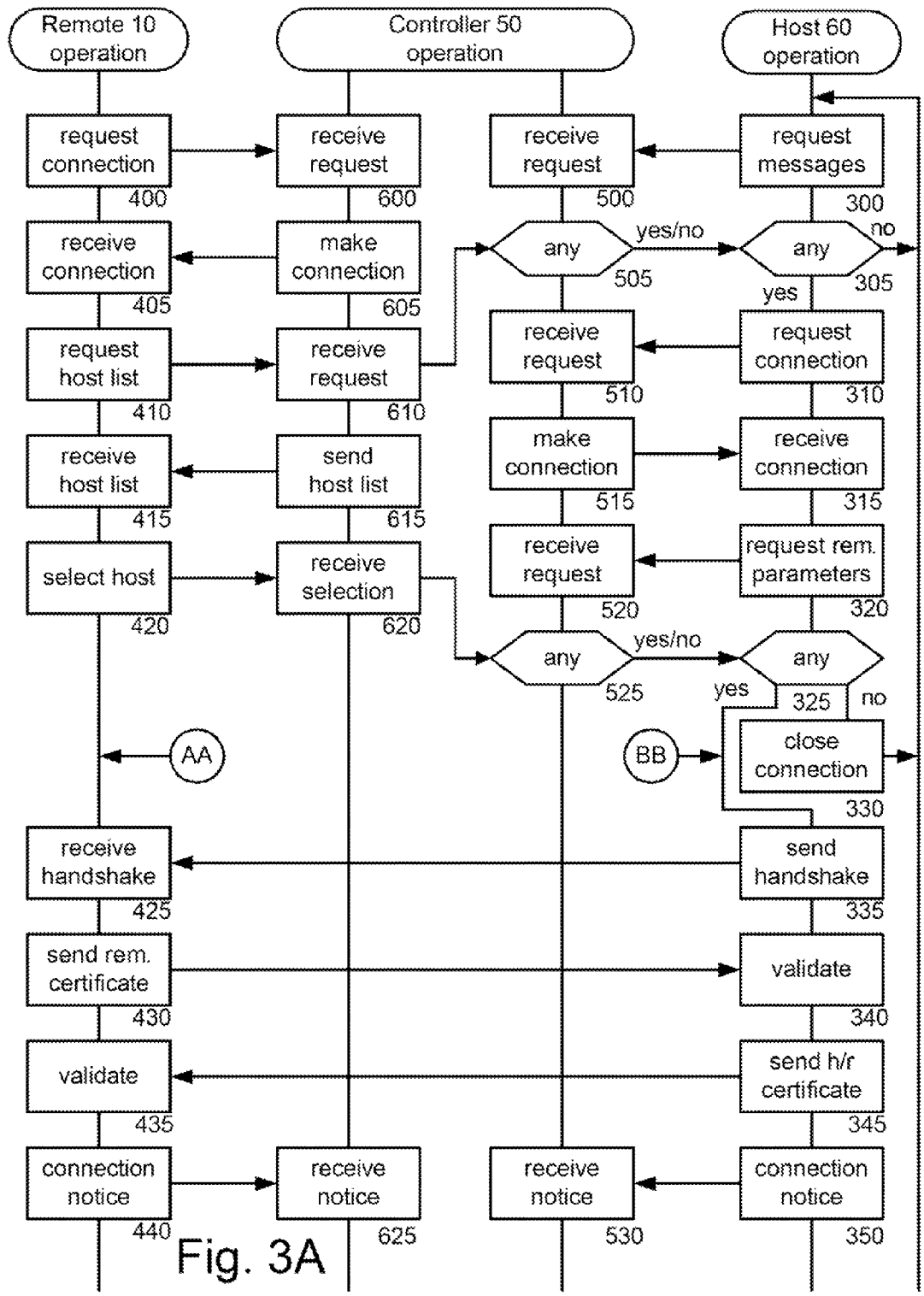
FIGS. 3A-3C are flowcharts showing an operational phase.
Figure 3B:
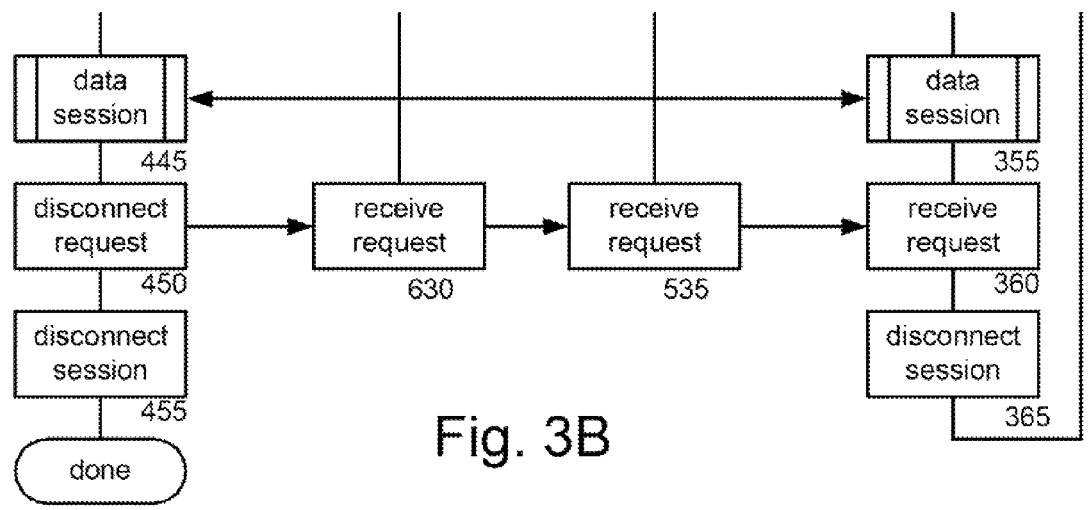
Figure 3C:
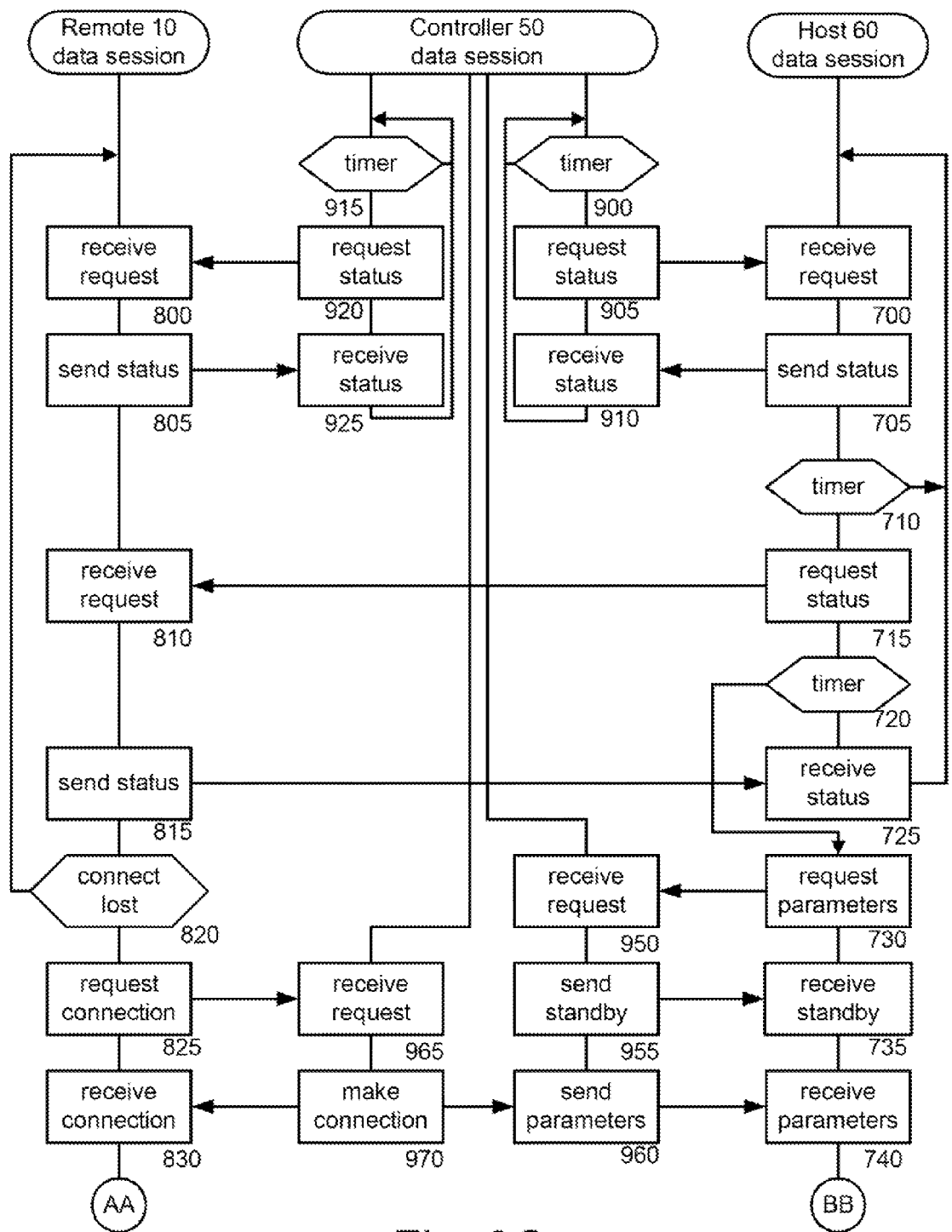

FIGS. 3A-3C, collectively referred to as FIG. 3, are flowcharts showing an operational phase.

FIG. 3 shows controller 50 as having one processing sequence for interacting with a host computer, another processing sequence for interacting with a remote computer, and the ability for these processing sequences to exchange messages. Controller 50 communicates at substantially the same time with a host and a remote to enable its processing sequences to exchange messages relating to each of the host and the remote. In other embodiments, controller 50 has a more monolithic processing sequence that interacts with both host and remote computers.

In the embodiment of FIG. 3, host 60 polls controller 50 for messages destined for host 60. This is particularly helpful if host 60 is behind a firewall, which would block unsolicited messages from controller 50. In other embodiments, the controller sends messages to the host computer in an asynchronous fashion rather than in the polling fashion described below.

At step 300, at the end of a predetermined time interval, host 60 sends a message to controller 50, requesting messages destined for host 60. More specifically, host 60 sends a Unix Data Packet (UDP) message. At step 305, host 60 checks whether any messages have been received. If not, processing returns to step 300. If a message has been received, processing continues at step 310.

At the start of its operation, controller 50 initiates a UDP listener role so that it can receive UDP messages, opens a TCP listener for messages from hosts and opens a TCP listener for messages from remotes.

At step 500, controller 50 receives a message from host 60 requesting messages destined for host 60. At step 505, controller 50 checks whether any remote computers might be trying to communicate with host 60. If so, controller 50 sends the remote computer's message to host 60. If not, controller 50 sends a "no messages" message to host 60. In other embodiments, controller 50 simply does not respond, and host 60 interprets the lack of a response after a predetermined time interval as a "no messages" message.

When a remote computer wants to interact with a host computer, the remote uses controller 50 to initiate a communications path to the host computer, as described below.

The process of requesting and receiving a connection involves a TCP initialization request, then the controller responds by initializing a secure socket layer (SSL) port and sending its controller certificate to the requester. The requester validates the controller certificate and sends its own certificate, i.e., a host certificate or a remote certificate, to the controller. The controller validates the requester's certificate and extracts its ID from the certificate. The controller validates the requester's ID against its database. If the ID is not valid, a connection is refused. If the ID is valid, a connection is made.

At step 400, remote 10 sends a message to controller 50 requesting a connection. At step 405, remote 10 receives a connection to controller 50. At step 410, remote 10 sends a message to controller 50 requesting a list of hosts that remote 10 is authorized to communicate with. At step 415, remote 10 receives an authorized hosts list from controller 50. At step 420, remote 10 selects one of the hosts from the list and sends a message indicating the selected host to controller 50.

In other embodiments, remote 10 has a list of authorized hosts stored therein, and after a connection to controller 50 is established, remote 10 simply sends a message with its selected host. If the selected host is not authorized, controller 50 sends a new authorized hosts list to remote 10. Also, during set-up (discussed above with regard to FIG. 2), in these other embodiments, remote 10 updates its stored authorized hosts list when it becomes authorized to interact with each host.

At step 600, controller 50 receives the connection request message from remote 10. At step 605, controller 50 establishes the connection. At step 610, controller 50 receives the request for an authorized hosts list. Controller 50 obtains the authorized hosts list from its database, and prepares a message for each host on the list indicating a possible connection from a remote. After such a message is prepared, at step 505, controller 50 forwards the message to host 60, as well as the other hosts on its list. This sequence corresponds to an early warning message to host 60 that a remote may wish to access the host; the early warning message is helpful in reducing the response time once a host is selected, that is, avoiding a delay due to the polled nature of communication between host 60 and controller 50. More specifically, controller 50 tells each host to establish a secure TCP connection to controller 50. At step 615, controller 50 sends the retrieved list of authorized hosts to remote 10. At step 620, controller 50 receives a message from remote 10 with the selected host, and makes this selection available to step 525, discussed below, along with the parameters for communicating with remote 10.

In other embodiments wherein the remote has a stored list of authorized hosts and sends a selection to the controller, the controller simply forwards this message to the selected host the next time the selected host asks for its messages.

Host processing relating to the early warning message of a possible remote connection will now be described.

If there is an early warning message; at step 310, host 60 sends a message to controller 50 requesting a connection. At step 315, host 60 receives a connection to controller 50. At step 320, host 60 sends a message to controller 50 requesting parameters for the possible channel with a remote computer; the parameters include the remote's ID and the IP address of the remote. In some embodiments, the parameters also include a token identifying the connection. At step 325, host 60 checks whether any parameters have been received. Actually, controller 50's response to the message from host 60 is to return one of (i) a message to standby since nothing has been received, (ii) parameters for the connection, or (iii) a message to disconnect the TCP connection since another host has been selected by the remote that requested the host list. If a standby message is received, host 60 waits for a predetermined time and may resend a message to controller 50 asking for parameters of the remote. If a disconnect message is received, at step 330, host 60 closes the connection to controller 50 and processing returns to step 300. If parameters have been received, such as the parameters for remote 10, processing continues at step 335.

At step 510, controller 50 receives the connection request message from host 60. At step 515, controller 50 establishes the connection. At step 520, controller 50 receives the parameter request message from host 60. At step 525, controller 50 checks whether any parameters have been received for this host from step 620. One of the hosts on the authorized host list will get parameters, the rest will not, since only one host-remote channel is being established. Controller 50 forwards the parameters to the selected host, and forwards a "disconnect" message to the rest of the hosts on the list.

In other embodiments, a remote computer can simultaneously establish a connection to multiple hosts on its authorized host list, and so multiple hosts will get parameters from the remote.

Setting up a communication channel between a remote computer and a host computer will now be described.

At step 335, host 60 sends a handshake to remote 10. At step 340, host 60 validates the remote certificate sent by remote 10. In the embodiments where a token is used, it is validated at this point. At step 345, host 60 sends the host/remote certificate to remote 10, and at step 350, host 60 sends a notice to controller 50 that a connection has been established between itself and remote 10.

At step 435, remote 10 receives the handshake from host 60. At step 430, remote 10 sends its remote certificate to host 60. At step 435, remote 10 validates the host/remote certificate received from host 60. At step 440, remote 10 sends a notice to controller 50 that a connection has been established between itself and host 60.

At step 530 and 635, controller 50 receives the connection notices respectively sent by host 60 and remote 10.

At steps 355 and 445, host 60 and remote 10 engage in a data session with each other. During this data session, input from remote 10 appears to be local input at host 60, and information that would be displayed at host 60 is actually sent to remote 10 for its local display. Virtual Network Computing (VNC), also known as remote frame buffer (RFB), remote control software makes it possible to view and fully-interact with one computer from any other computer or mobile device anywhere on the Internet. VNC software is cross-platform, allowing remote control between different types of computers. The open source version of VNC has been freely available since 1998, and more than 20 million copies of the software have been downloaded. In other embodiments, another technique is used to convert screen displays from host screen format to remote screen format.

During a data session, host 60 and controller 50 may exchange "keep alive" messages, discussed with regard to FIG. 3C. Also during a data session, the channel between a remote computer and a host computer may be lost, and there is a processing sequence for reestablishing the channel, also discussed with regard to FIG. 3C.

To disconnect a session, remote 10 notifies controller 50.

When the user of remote 10 has finished with her session with host 60, she creates a disconnect message such as by clicking on an icon. At step 450, remote 10 sends the disconnect request to controller 50. At step 455, remote 10 disconnects the session and its processing is complete. In some embodiments, if the user does not take any action for a predetermined amount of time, the session is automatically terminated.

At step 630, controller 50 receives the disconnect request from remote 10, and passes the message to step 535. In some embodiments, controller 50 tracks usage by remote 10 and updates its usage records.

At step 535, controller 50 forwards the disconnect request to host 60. In some embodiments, controller 50 tracks usage by host 60 and updates its usage records.

At step 360, host 60 receives the disconnect message from controller 50, and at step 365, disconnects the data session with remote 10. Processing returns to step 300.

In other embodiments, to disconnect a session, remote 10 notifies host 60 directly. When usage tracking occurs in these other embodiments, at least one of remote 10 and host 60 notify controller 50 that the session has been disconnected.

FIG. 3C depicts a technique employed for keeping the connection with host 60 alive even if remote 10 is inactive for awhile, and also depicts a technique for reestablishing communication when remote 10 switches IP addresses, thereby enabling remote 10 to be mobile.

In some configurations, if host 60 does not receive any information from remote 10 for a predetermined amount of time, host 60 automatically closes the communication channel to remote 10. In other configurations, a firewall associated with host 60, either directly or through a local area network, automatically terminates the channel. Accordingly, the following technique ensures that there is activity on the channel so that undesired automatic termination is prevented.

At step 900, controller 50 sets a timer, and at the conclusion of the timer interval, at step 905, sends a status request message to host 60. At step 910, controller 50 receives the status message and processing returns to step 900.

At step 700, host 60 receives a status request message from controller 50, and at step 705, responds to the status request message.

A similar "keep-alive" technique is performed by controller 50 for remote 10.

At step 915, controller 50 sets a timer, and at the conclusion of the timer interval, at step 920, sends a status request message to remote 10. At step 925, controller 50 receives the status message and processing returns to step 915.

At step 800, remote 10 receives a status request message from controller 50, and at step 805, responds to the status request message.

Remote 10 may, during the course of its travels, lose its communications connection, such as when it moves from one WiFi area to another. Alternatively, the wireless channel for remote 10 may be dropped by the communications carrier. It is assumed that shortly thereafter, remote 10 will reestablish the connection, either automatically or via user intervention. This dropped connections situation is expected to occur regularly, so this embodiment provides a technique whereby hosts keep checking for a dropped connection, and coordinate with the controller for smooth re-establishing of the connection, and meanwhile remotes promptly engage with the controller to reestablish a dropped connection. In short, this technique enables dynamic tracking of remote 10 by controller 50.

At step 710, host 60 sets a timer, and if a message from remote 10 is received prior to the end of the timer interval, processing returns to step 700. If, at the conclusion of the time interval, no messages have been received from remote 10, then at step 715, host 60 sends a status request message to remote 10. At step 720, host 60 sets another timer, and if a status message is received from remote 10 prior to the end of the tinier interval, processing returns to step 700. If no messages have been received by the end of the timer interval, then host 60 concludes that the connection has been lost, and at step 730, host 60 sends a parameter request to controller 50 as discussed above with regard to step 320. At step 735, host 60 receives at least one standby message from controller 50; generally, many standby messages are received, until at step 740, host 60 receives the parameters for the connection from controller 50, and processing continues at step 335.

At step 810, remote 10 receives the status request sent from host 60 at step 715, and at step 815, sends its status to host 60.

Corresponding to this activity, at step 950, controller 50 receives the parameter request from host 60. At step 955, controller 50 sends at least one standby message to host 60. Generally, controller 50 sends a standby message at a predetermined interval of time, to keep the connection alive, until new parameters are received from remote 10, and then at step 960, controller 50 sends the new parameters to host 60.

At step 820, remote 10 checks whether it has lost its communication connection. If not, processing returns to step 800. If so, at step 825, remote 10 requests a connection from controller 50, as generally described above with regard to step 400. At step 830, remote 10 receives a connection, and processing continues at step 425.

Corresponding to the above-described activity, at step 965, controller 50 receives a connection request from remote 10, and at step 970, grants a connection to remote 10. Also at step 970, controller 50 sends the connection parameters to step 960 for relaying to host 60.

Figure 4:
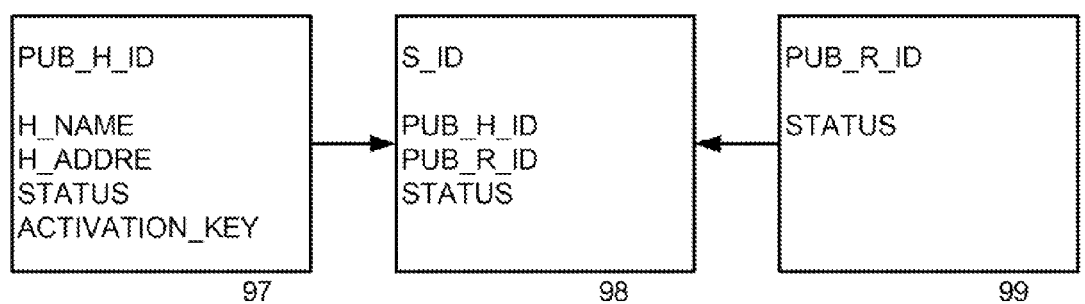
FIG. 4 is a diagram showing a controller data structure.

FIG. 4 is a diagram showing a controller data structure. Record 97 represents host 60. Record 99 represents remote 10. Record 98 represents the ability of remote 10 to access host 60.

As shown in record 97, the primary key used to access the record is the host's public ID. Information stored in the record includes parameters provided during set-up, such as the host's name and address, as well as billing related information (not shown). Also present are a status field, indicating whether the host is currently active or inactive, and an activation key field, for the activation ID discussed above at step 145.

As shown in record 99, the primary key used to access the record is the remote's public ID. In some embodiments, identifying information is stored in the record. A status field indicated whether the remote is currently active or inactive. If a remote activation ID is used, then it is stored in an activation key field (not shown).

As shown in record 98, the primary key used to access the record is a subscription ID, which is a sequential number created when an association is made between a remote and a host. In some embodiments, a subscription ID is created when a host is activated prior to association of any remotes with the host. Information stored in the record includes the host's public ID, which serves as the primary key for the host's record in controller 50, the remote's public ID, which serves as the primary key for the remote's record in controller 50, and a status field indicating whether or not there is an active connection between the remote and the host.

In the embodiment discussed above, controller 50 has no access to the data exchanged between remote 10 and host 60. Controller 50 facilitates public key management between remote 10 and host 60. In other embodiments, a security scheme such as Kerberos may be used, and in these embodiments, controller 50 can decrypt the data exchanged by remote 10 and host 60.

In other embodiments, the SSL implementation uses the Diffie-Hellman algorithm so that the so-called perfect forward secrecy is achieved.

Although an illustrative embodiment of the present invention, and various modifications thereof, have been described in detail herein with reference to the accompanying drawings, it is to be understood that the invention is not limited to this precise embodiment and the described modifications, and that various changes and further modifications may be effected therein by one skilled in the art without departing from the scope or spirit of the invention as defined in the appended claims.

What is claimed is:

1. A method of enabling a remote to communicate with a host, comprising:
   connecting the remote to a controller,
   sending a selection of the host from the remote to the controller,
   responding, at the remote, to a connection request from the host that was sent in response to a message from the controller, the message from the controller to the host being an instruction from the controller to establish a connection to the remote,
   sending a notice from the remote to the controller that a connection exists between the remote and the host,
   after sending the notice, sending input from the remote to the host without assistance from and without resources of the controller, and
   after sending the notice, receiving, at the remote, screen display output from the host without assistance from and without resources of the controller.

2. The method of claim 1, wherein the host is behind a firewall computer.

3. The method of claim 1, wherein the remote is one of a general purpose computer, a portable computer and a personal digital assistant.

4. The method of claim 1, wherein the controller executes listener role software for communicating with each of the host and the remote.

5. The method of claim 1, wherein the controller does not send the address of the selected host to the remote.

6. The method of claim 1, wherein the controller communicates with the selected host and the remote at substantially the same time.

7. The method of claim 1, wherein the input from the remote to the host is a user input to a program executing on the host, and the screen display output from the host is generated by the program executing on the host in response to the user input.

8. The method of claim 1, wherein the responding, at the remote, to a connection request from the host includes sending a remote certificate from the remote to the host without assistance from the controller.

9. The method of claim 8, further comprising:
   receiving, at the remote, a host-remote certificate from the host, and
   validating, at the remote, the host-remote certificate.

10. The method of claim 1, further comprising receiving a menu of hosts from the controller.

11. The method of claim 1, further comprising retrieving a menu of hosts from storage in the remote.

12. The method of claim 1, further comprising sending, to the controller, a digital identity certificate containing (i) the public half of an asymmetric key algorithm key pair, (ii) identity information for the remote, and (iii) a digital signature of the issuing certificate authority.

13. The method of claim 1, further comprising sending, to the host, a digital identity certificate containing (i) the public half of an asymmetric key algorithm key pair, (ii) identity information for the remote, and (iii) a digital signature of the issuing certificate authority.

14. The method of claim 1, further comprising receiving, from the host, a digital identity certificate containing (i) the public half of an asymmetric key algorithm key pair, (ii) identity information for the pair consisting of the host and the remote, and (iii) a digital signature of the issuing certificate authority.

15. The method of claim 1, further comprising checking whether a connection with the host has been lost, and if so, sending a connection request from the remote to the controller.

* * * * *